United States Patent [19]

Kurahayashi et al.

[11] 4,264,933
[45] Apr. 28, 1981

[54] METHOD AND APPARATUS FOR FACSIMILE RECORDING

[75] Inventors: Sadasuke Kurahayashi, Tokyo; Asao Watanabe, Kurume; Hideaki Sato; Yoshiaki Shirato, both of Yokohama; Akira Shinmi, Kawasaki; Toshitami Hara, Tokyo; Yoshioki Hajimoto, Chofu; Masahisa Fukui, Yokohama, all of Japan

[73] Assignee: Canon Kabushiki Kaisha, Tokyo, Japan

[21] Appl. No.: 925,747

[22] Filed: Jul. 18, 1978

[30] Foreign Application Priority Data

Jul. 27, 1977 [JP] Japan ............................. 52-90178
Jan. 9, 1978 [JP] Japan ............................. 53-1027

[51] Int. Cl.$^3$ ............................................. H04N 1/22
[52] U.S. Cl. ............................... 358/296; 358/260; 360/71
[58] Field of Search ............... 358/296, 261, 260, 298; 346/76 PH, 154; 360/71

[56] References Cited

U.S. PATENT DOCUMENTS

| 3,958,251 | 5/1976 | Borelli | 346/154 |
| 4,047,228 | 9/1977 | Yagishita | 358/261 |
| 4,157,553 | 6/1979 | Diddens | 346/154 |

Primary Examiner—James W. Moffitt
Assistant Examiner—Alan Faber
Attorney, Agent, or Firm—Fitzpatrick, Cella, Harper & Scinto

[57] ABSTRACT

The present invention discloses a technique of effecting recording on a recording medium by a plurality of recording elements, wherein recording density by the plurality of recording elements is varied. Further, the recording density by the plurality of recording elements is varied in accordance with a time required for electrical transmission of informations to be recorded for definite numbers of scanning lines. For example, when the time required for such electrical transmission is short, the recording is effected by small numbers of the recording elements, while, when the time required for the electrical transmission is long, the recording operation is effected by large numbers of the recording elements, thereby preventing the image quality from lowering.

30 Claims, 29 Drawing Figures

W4, B4, W10, B4, W10, B3, W12, B11, W10 (130 BITS)

(f) W130 (130 BITS)

(g) B130 (130 BITS)

(h) 110011, 010, 000, 010, 1010, 110000, 010, 010, 110011, 010, 010, 010, 011, 011, 110001, 011, 110001, 010, 110011, 110010 110001 88 BITS (i) 111111100000001 14 BITS (j) 000 1111110000000 17 BITS

FIG. 2

| RUN LENGTH OF WHITE OR BRACK | CODE | | CODE LENGTH |
|---|---|---|---|
| | ADDRESS | REMINDER | |
| 1 | 0 | 0 0 | 3 |
| 2 | 0 | 0 1 | 3 |
| 3 | 0 | 1 0 | 3 |
| 4 | 0 | 1 1 | 3 |
| 5 | 1 0 | 0 0 | 4 |
| 6 | 1 0 | 0 1 | 4 |
| 7 | 1 0 | 1 0 | 4 |
| 8 | 1 0 | 1 1 | 4 |
| 9 | 1 1 0 | 0 0 0 | 6 |
| 10 | 1 1 0 | 0 0 1 | 6 |
| ⋮ | ⋮ | ⋮ | ⋮ |
| 15 | 1 1 0 | 1 1 0 | 6 |
| 16 | 1 1 0 | 1 1 1 | 6 |
| 17 | 1 1 1 0 | 0 0 0 0 | 8 |
| 18 | 1 1 1 0 | 0 0 0 1 | 8 |
| ⋮ | ⋮ | ⋮ | ⋮ |
| 32 | 1 1 1 0 | 1 1 1 1 | 8 |
| 33 | 1 1 1 1 0 | 0 0 0 0 0 | 10 |
| ⋮ | ⋮ | ⋮ | ⋮ |
| 64 | 1 1 1 1 0 | 1 1 1 1 1 | 10 |
| 65 | 1 1 1 1 1 0 | 0 0 0 0 0 0 | 12 |
| ⋮ | ⋮ | ⋮ | ⋮ |
| 128 | 1 1 1 1 1 0 | 1 1 1 1 1 1 | 12 |
| 129 | 1 1 1 1 1 1 0 | 0 0 0 0 0 0 0 | 14 |
| ⋮ | ⋮ | ⋮ | ⋮ |
| 256 | 1 1 1 1 1 1 0 | 1 1 1 1 1 1 1 | 14 |
| 257 | 1 1 1 1 1 1 1 0 | 0 0 0 0 0 0 0 0 | 16 |
| ⋮ | ⋮ | ⋮ | ⋮ |
| 512 | 1 1 1 1 1 1 1 0 | 1 1 1 1 1 1 1 1 | 16 |
| 513 | 1 1 1 1 1 1 1 1 0 | 0 0 0 0 0 0 0 0 0 | 18 |
| ⋮ | ⋮ | ⋮ | ⋮ |
| 1024 | 1 1 1 1 1 1 1 1 0 | 1 1 1 1 1 1 1 1 1 | 18 |
| 1025 | 1 1 1 1 1 1 1 1 1 0 | 0 0 0 0 0 0 0 0 0 0 | 19 |
| ⋮ | ⋮ | ⋮ | ⋮ |
| 1152 | 1 1 1 1 1 1 1 1 1 0 | 0 0 0 1 1 1 1 1 1 1 | 19 |
| MARGIN | 1 1 1 1 1 1 1 1 1 0 | 0 1 1 1 1 1 1 1 1 1 | 19 |

METHOD AND APPARATUS FOR FACSIMILE RECORDING

BACKGROUND OF THE INVENTION

1. Field of the Invention

The present invention relates to a method and apparatus for recording of informations on a recording medium, in which a recording member consisting of a plurality of recording elements which perform recording of the informations is used to vary the recording density and reduce possible lowering of the image quality, thereby shortening the time required for the information recording.

2. Description of the Prior Arts

There have heretofore been contemplated various methods for recording image informations on recording paper. One example of such recording method is a so-called heat-sensitive recording method which is inexpensive in cost of the recording paper and easy for maintenance, on account of which the method has been widely used in various kinds of printers, medium and low speed facsimiles, and so forth. Since, however, the recording speed by this method is rather slow, it is not used at present for high speed facsimiles and printers.

When the image recording is to be made by the conventional thermal recording head, a time required for a period of from start of electric conduction accompanied by temperature increase in the head upto completion of the recording on the recording medium is usually from 0.5 ms to 1.0 ms, and a time required for cooling the head in preparation for the subsequent recording is approximately from 10 ms to 15 ms.

On the other hand, in the high speed facsimile which is generally called "one-minute facsimile", the shortest time $T_{MIN}$ for the electrical transmission of one line (a single scanning line in the image scanning operation) in case of transmitting a simple image information is usually 10 ms. Accordingly, considering from the above-mentioned recording characteristic, even when one line is simultaneously recorded using a thermal multihead for one line, the cooling time of the head becomes short, and deterioration in the recorded image such as ghost, etc. cannot be avoided.

SUMMARY OF THE INVENTION

The primary object of the present invention is to provide an improved method and apparatus for recording, in which the recording speed is increased.

The secondary object of the present invention is to provide an improved method and apparatus for recording, in which deterioration in the recorded image such as ghost, etc. liable to occur, when a thermal head is used, is eliminated.

The third object of the present invention is to provide an improved recording device, the size of which has been successfully reduced.

The fourth object of the present invention is to provide an improved method and apparatus for recording, in which deterioration in the image quality in a complicated image pattern has been successfully prevented.

The fifth and last object of the present invention is to provide an improved method and apparatus for recording which is applicable to a heat-sensitive recording apparatus operable with inexpensive recording sheet and recording member which is easy to maintain.

DESCRIPTION OF THE PREFERRED EMBODIMENTS

Electrical transmission of image informations in a high speed facsimile is generally done by a modulator-demodulator (MODEM) having a transmission speed of 4800 BPS (Bit Per Second) or 9600 BPS as the result of reducing the number of bit to be transmitted by subjecting binary image signals representing states of two image formations to a band compression treatment. Here, since the electrical transmission speed of codes is constant, there is remarkable difference in the transmission time between one line having a complicated image pattern and one line having a simple image pattern.

Therefore, in the recording method and apparatus according to the present invention, the above-mentioned difference in the signal transmission time is utilized to enable the high speed recording on a recording member having a medium recording speed (e.g., a thermal recording head in the heat-sensitive recording system) to be realized.

Figure 1:
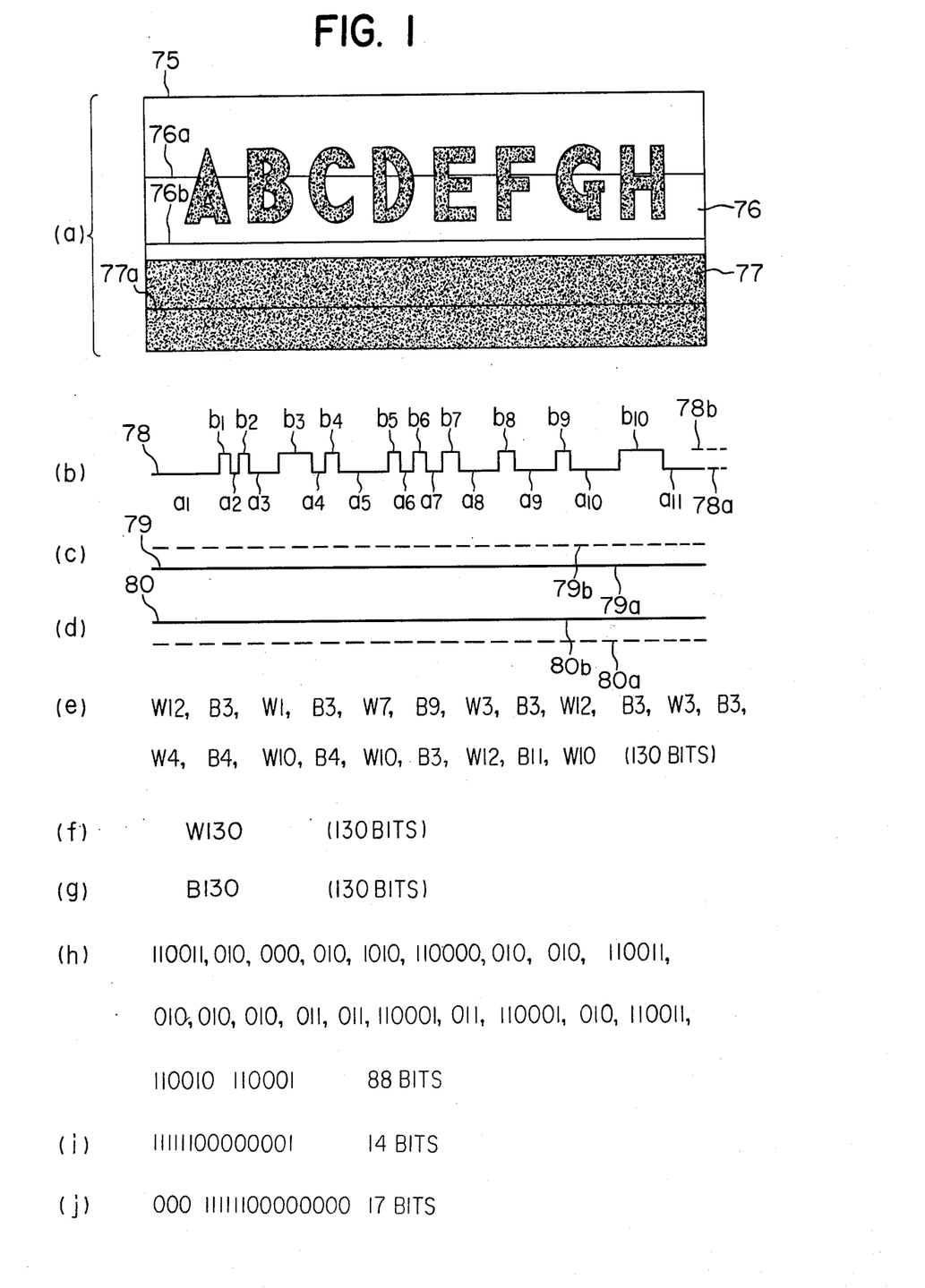
FIG. 1(a) shows a front view of an image original to be electrically transmitted.
FIG. 1(b) to FIG. 1(d) respectively show binary image signal waveforms.
FIG. 1(e) to FIG. 1(g) respectively show abbreviated symbols for the binary image signals.
FIG. 1(h) to FIG. 1(j) respectively show transmission codes for the binary image signals.

In the following, one example of the present invention is explained in reference to the accompanying drawing. FIG. 1(a) shows a scanning portion of an image original to be transmitted, and FIGS. 1(b) to 1(j) respectively represent the compression method of binary image signals obtained by the above-mentioned scanning.

A reference numeral 75 in FIG. 1(a) designates an image original, and 76a, 76b and 77a respectively indicate individual single scanning lines. FIGS. 1(b), 1(c) and 1(d) respectively show binary image signals obtained by scanning the image original from left to right along the above-mentioned scanning lines 76a, 76b and 77a. A black portion 77 in FIG. 1(a) is represented by black level signals 78b in FIG. 1(b), and signals for a white portion 76 in FIG. 1(a) are represented by white level signals 78a in FIG. 1(b). In FIG. 1(a), when the scanning operation is started from the left end along the scanning line 76a, the black run signals $78b_1$, $78b_2$, . . . belonging to the black level 78b in the character portion of "A" are obtained. Similarly, there can be obtained respectively the black run $b_3$ in the character "B" portion, the black run $b_4$ in the character "C" portion, the black run $b_5$, $b_6$ in the character "D" portion, the black run $b_7$ in the character "E" portion, the black run $b_8$ in the character "F" portion, the black run $b_9$ in the character "G" portion, and the black run $b_{10}$ in the character "H" portion. Between the adjacent black runs, there exist white runs belonging to the white level $78a$ which are designated by the white runs $a_1, a_2, \ldots, a_{11}$. The information quantity (bit) and symbol for each of the black runs $b_1$ to $b_{10}$ and the white runs $a_1$ to $a_{11}$ are as shown in Table 1 below.

TABLE 1

| WHITE RUN | BIT | SYMBOL | BLACK RUN | BIT | SYMBOL |
|---|---|---|---|---|---|
| $a_1$ | 12 | W12 | $b_1$ | 3 | B3 |
| $a_2$ | 1 | W1 | $b_2$ | 3 | B3 |
| $a_3$ | 7 | W7 | $b_3$ | 9 | B9 |
| $a_4$ | 3 | W3 | $b_4$ | 3 | B3 |
| $a_5$ | 12 | W12 | $b_5$ | 3 | B3 |
| $a_6$ | 3 | W3 | $b_6$ | 3 | B3 |
| $a_7$ | 4 | W4 | $b_7$ | 4 | B4 |
| $a_8$ | 10 | W10 | $b_8$ | 4 | B4 |
| $a_9$ | 10 | W10 | $b_9$ | 3 | B3 |
| $a_{10}$ | 12 | W12 | $b_{10}$ | 11 | B11 |
| $a_{11}$ | 10 | W10 | | | |

From the above Table, since the total information quantity in the above-mentioned image informations stands for the total sum of the black run bits and the white run bits, it will be 130 bits in all. The group of abbreviated symbols shown in FIG. 1(e) are the arrangement of the abbreviated symbols shown in Table 1 above (the black runs are denoted by "B", and the white runs by "W"; those numerals after the symbols B and W indicate the information quantity (bit quantity), hence the above-mentioned binary image signals are visually perceived) in accordance with the scanning sequence of the signal 78 shown in FIG. 1(b), i.e., from left to right. Similarly, since the scanning line 76b is converted to a signal 79 consisting of the white runs of 130 bits, and the scanning line 77a is converted to a signal 80 consisting of the black runs of 130 bits, the signals in FIGS. 1(c) and 1(d) can be represented by the abbreviated symbols in FIGS. 1(f) and 1(g), respectively. The group of codes in FIG. 1(h) denote the transmission codes resulted from compression treatment (i.e., the primary run length codifying treatment by Wyle's code see Reduced-Time Facsimile Transmission by Digital Coding, H. Wyle, et al. pps. 215–222, September, 1961- I R E Transactions on Communications systems) of the abbreviated symbols shown in the group of the abbreviated symbols in FIG. 1(e). The term "primary run length codifying treatment" is meant by a band compression method to reduce the total bit numbers by representing continuing length of the black and white runs in the binary image signal (hereinafter simply referred to as "run length") in terms of binary codes. The term "Wyle's code" refers to codification of the binary image signal by the method shown in FIG. 2. (Besides this, there are several codification methods, such as Huffman codification, Go lomb codification, and so forth, the details of which are dispensed with in this specification.)

In the group of codes in FIG. 1(h), the code 110011 at the upper left end corner corresponds to the abbreviated symbol W12 at the upper left end of the group of abbreviated symbols in FIG. 1(e), while, in the group of abbreviated symbols in FIG. 1(h), the code 010 subsequent to the above-mentioned code 110011 corresponds to the abbreviated symbol B3 following the symbol W12 in the group of abbreviated symbols in FIG. 1(e). The other codes and the abbreviated symbols in the respective groups correspond in the same manner. Accordingly, the codes 110011, 010, . . . in the group of codes in FIG. 1(e) are the results of codification of the abbreviated symbols W12, B3, . . . in the group of abbreviated symbols in FIG. 1(e).

Figure 2:
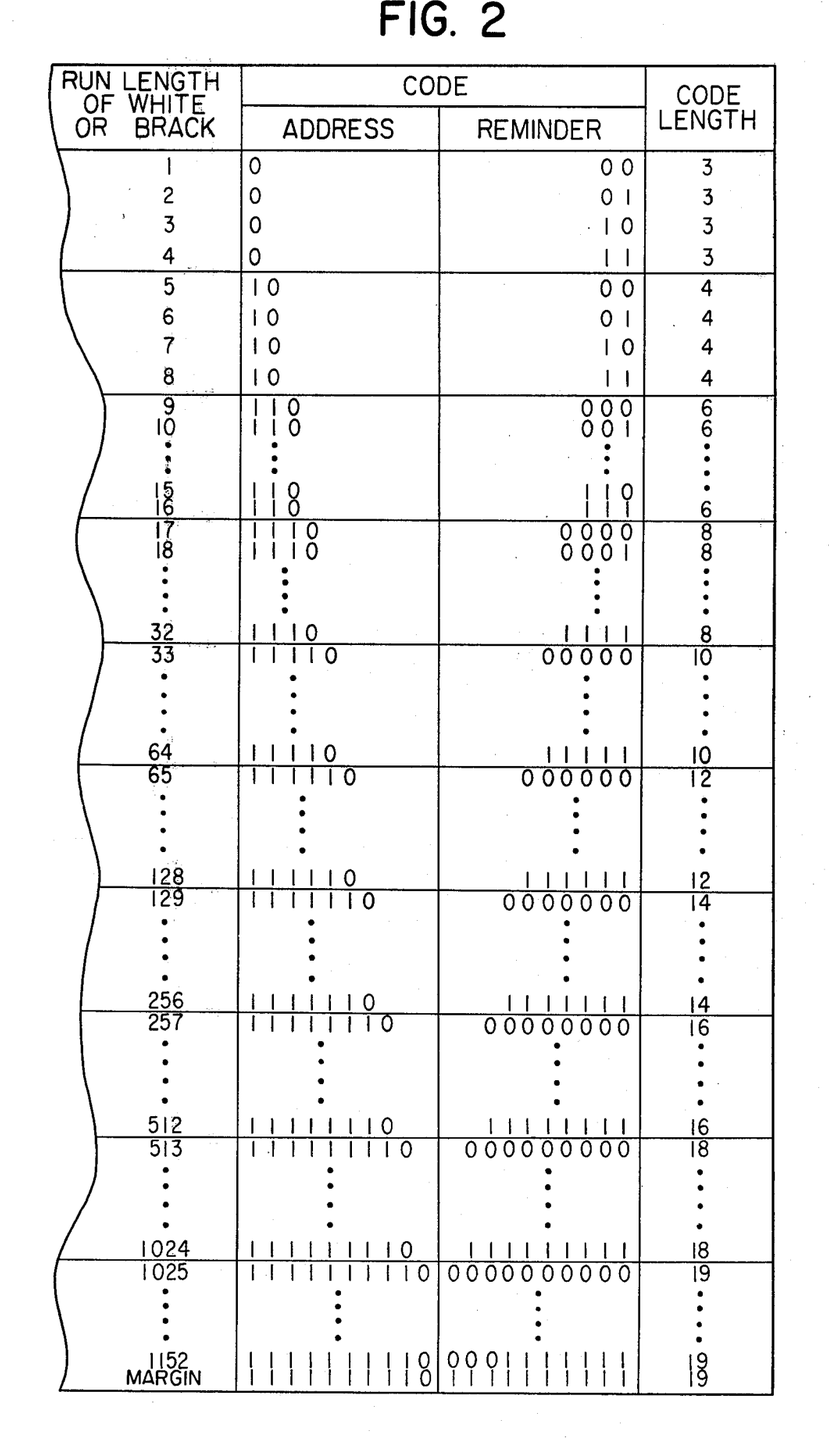
FIG. 2 is a diagram showing Wyle's codes.

In the following, explanations will be given to the Wyle's codes. The Wyle's codes shown in FIG. 2 is composed of an address code (a code to determine the code length and bias) accompanied by a reminder code (a code to determine the run length). For instance, since the above-mentioned black run $b_1$ (abbreviated symbol B3) contains three bits, the codification thereof can be effected by finding the codes is the columns "ADDRESS" and "REMINDER" corresponding to the numeral "3" in the column "RUM LENGTH OF WHITE OR BLACK", where the codes are respectively indicated "0" for the address and "10" for the reminder, hence the code will be "010". Similarly, the 10-bit can be codified into 110001, and the 12-bit can be codified into 110011 (omitted in FIG. 2). In this manner, the group of abbreviated symbols in FIG. 1(e) can be converted to a group of the transmission codes in FIG. 1(h). (The "Wyle's codes" in the present invention are formed into the 10-bit construction by adding "0" at the right end of the code in the column "ADDRESS" in the section designated by "1025 to 1152" and "Margin" in the column "RUN LENGTH OF WHITE OR BLACK".) The information quantity of the above-mentioned transmission codes converted by the Wyle's codes is therefore determined by the number of "0" or "1" present in the code. Accordingly, the total information quantity of the group of codes in FIG. 1(h) is 88 bits, from which it is understood that the informations are fairly compressed in comparison with the 130-bit construction of the group of abbreviated symbols in FIG. 1(e). Since the compression ratio is generally represented by "the total bit number for one line divided by the total bit number after the compression treatment", the abovementioned compression ratio becomes $130 \div 88 \approx 1.48$. Similarly, the abbreviated symbols in FIGS. 1(f) and 1(g) can be convereted to the codes in FIGS. 1(i) and 1(j), respectively. In this case, the compression ratio of the code (i) becomes $130 \div 14 \approx 9.29$, and the compression ratio of the code (j) becomes $130 \div 17 \approx 7.65$ (this will be described later). In the groups of the transmission codes (h) and (i) in FIGS. 1(h) and 1(i), the head block is usually regarded as the white run, and both white and black runs are represented alternately, so that do not require the above-mentioned groups of the transmission codes (h) and (i) signals to discriminate the black and white runs. However, in the code (j) in FIG. 1(j), a discrimination code "000" needs be added (to increase by 3-bit) when the head block is the black run. Thus, the bit number after the compression treatment differs by several times between the binary image signal (b) having the complicated image pattern and the signals (c) and (d) having a simple image pattern with the consequent difference by several times in the transmission time.

Thus, the high speed facsimile is characterized in that the transmission time for one line becomes short when a simple image information is transmitted, and the transmission time for one line becomes longer when a complicated image information is transmitted.

Therefore, the embodiment of the present invention is so designed that the thermal multi-heads are divided into two groups of the even number head group (A group) and the odd number head group (B group) to effect alternate recording operations by these A and B groups, thereby covering shortage in the cooling time of the heads. When the image information of a line, for which a long transmission time is required, is to be recorded, the recording operation (of half information taken every one bit out of one line information) is effected by either A or B group head, thereafter the remaining half of the informations of the same line is recorded with the other group head, thereby carrying out recording of the entire image. On the other hand, when the image information of a line sent in a short transmission time is to be recorded, the recording is performed only by either one of the head groups, after which the recording of the subsequent line is commenced. According to such recording method, when a complicated image pattern is recorded, the recording is done with the entire heads, hence high degree of image resolution will not be impaired. Further, when a simple image pattern is recorded, the image resolution is reduced to a half because of the image being recorded with either one of the head groups, although no practical deterioration in the image quality takes place.

Here, if the electric conduction time in the recording heads of each group is taken 1 m sec., and the cooling time is taken 7 m sec., the total recording time ($T_p$) becomes 8 m sec. By alternately effecting the recording operation for each group, however, the cooling time after the electronic conduction becomes 15 m sec. (=7 m sec.+8 m sec.) for each group head, whereby a sufficient cooling time which does not bring about the ghost can be obtained. In addition, the high speed recording becomes possible. In other words, according to the heretofore known recording method and apparatus wherein the electric conduction is effected to all the heads (heat generating elements), approximately 12 m sec. is required for the cooling time, while, according to the present invention wherein the electric conduction is performed alternately to the two groups of heads, the cooling time required is approximately 7 m sec. When the electric conduction time is set 1 m sec. for both cases, the recording time for one line by the conventional recording method and apparatus will be 13 m sec. (=1 m sec.+12 m sec.). On the other hand, according to the above-mentioned embodiment of the recording method and apparatus of the present invention, the recording time when the information for one line with the head of one group is 8 m sec. (1 m sec.+7 m sec.), while the recording time for recording the information for one line with the heads of the two groups is 16 m sec. (8 m sec.+8 m sec.).

It is understood that, when the informations of the first line are transmitted, and then the informations of the second line are transmitted, the informations of the first line are recorded, while the informations of the second line are being transmitted. It is also understood that the treatment time is either the time required for transmitting the informations of the second line or the time required for recording the informations of the first line, whichever longer. It is further understood that the informations in both first and second lines are substantially same in their transmission time. Now assume that the informations containing a complicated image pattern are transmitted, and the transmission time thereof is 20 m sec. The treatment time in the conventional recording method and apparatus is 20 m sec. (>13 m sec.), while the treatment time in the recording method and apparatus according to the present invention is 20 m sec. (>16 m sec.), hence no substantial difference between them. However, when the informations containing a simple image pattern are transmitted, and the transmission time thereof is 10 m sec., the treatment time by the conventional recording method and apparatus is 13 m sec. (>10 m sec.), while the treatment time in the recording method and apparatus of the present invention becomes 10 m sec. (>8 m sec.), hence the present invention shortens the treatment time by 3 m sec. (13 m sec.−10 m sec.). Since the shortening of the above-mentioned treatment time is for one line, the overall treatment time for one sheet of image original to be transmitted is further shortened, whereby the high speed recording becomes possible.

Accordingly, when the recording method and apparatus of the present invention are used, the ghost phenomenon can be reduced to the minimum, the high speed recording becomes possible, and size-reduction in the apparatus (or the size-reduction in the power source section for driving the thermal head due to the thermal head being divided into a plurality of groups) can be realized.

Figure 3:
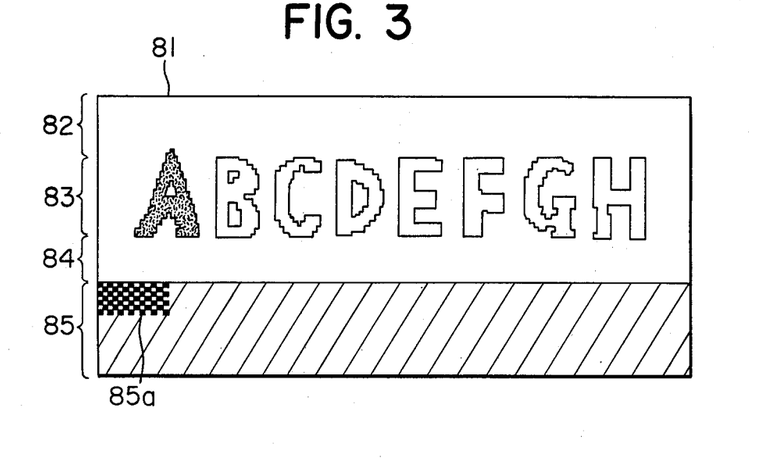
FIG. 3 is a front view of image informations as received.

FIG. 3 shows one example of the recorded image by the use of the present invention. The drawing is an enlarged view when the image original to be transmitted shown in FIG. 1(a) is received on the recording medium, in which a reference numeral 81 designates a received image, 82, 84 and 85 designate portions in the recording medium where the recording has been effected with a half degree of image resolution due to shortness of time required for electrical transmission of one line, and 83 designates a portion where the recording has been done with the normal degree of image resolution. In particular, the portion designated by 85 indicates that the total black portion is in the checkered pattern as shown by 85a, which is evidently capable of conveying the informations to a satisfactory degree due to the space gap filling function of the eye sight.

In the following, explanations will be given as to a preferred embodiment to realize the recording method and apparatus according to the present invention.

First of all, the time setting will be done as follows. The shortest transmission time of facsimile signal for one line is made $T_{MIN}$. This timing is necessary for transmitting the facsimile signal for one line, wherein the compression ratio is the maximum. This is $T_{MIN}=10$ ms in the ordinary high speed facsimile.

The recording time by the thermal head is made $T_p$, which is a sum of the electric conduction time (1 ms) and the cooling time (7 ms), hence $T_p=8$ ms.

Figure 4:
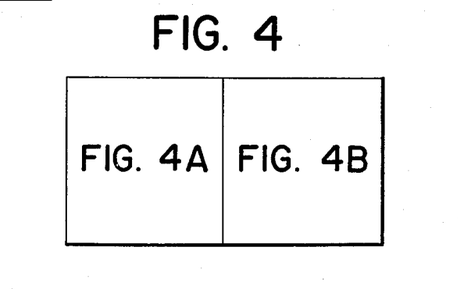
FIG. 4, 4A and 4B is an electrical circuit construction diagram of the recording apparatus according to the present invention.
Figure 4A:
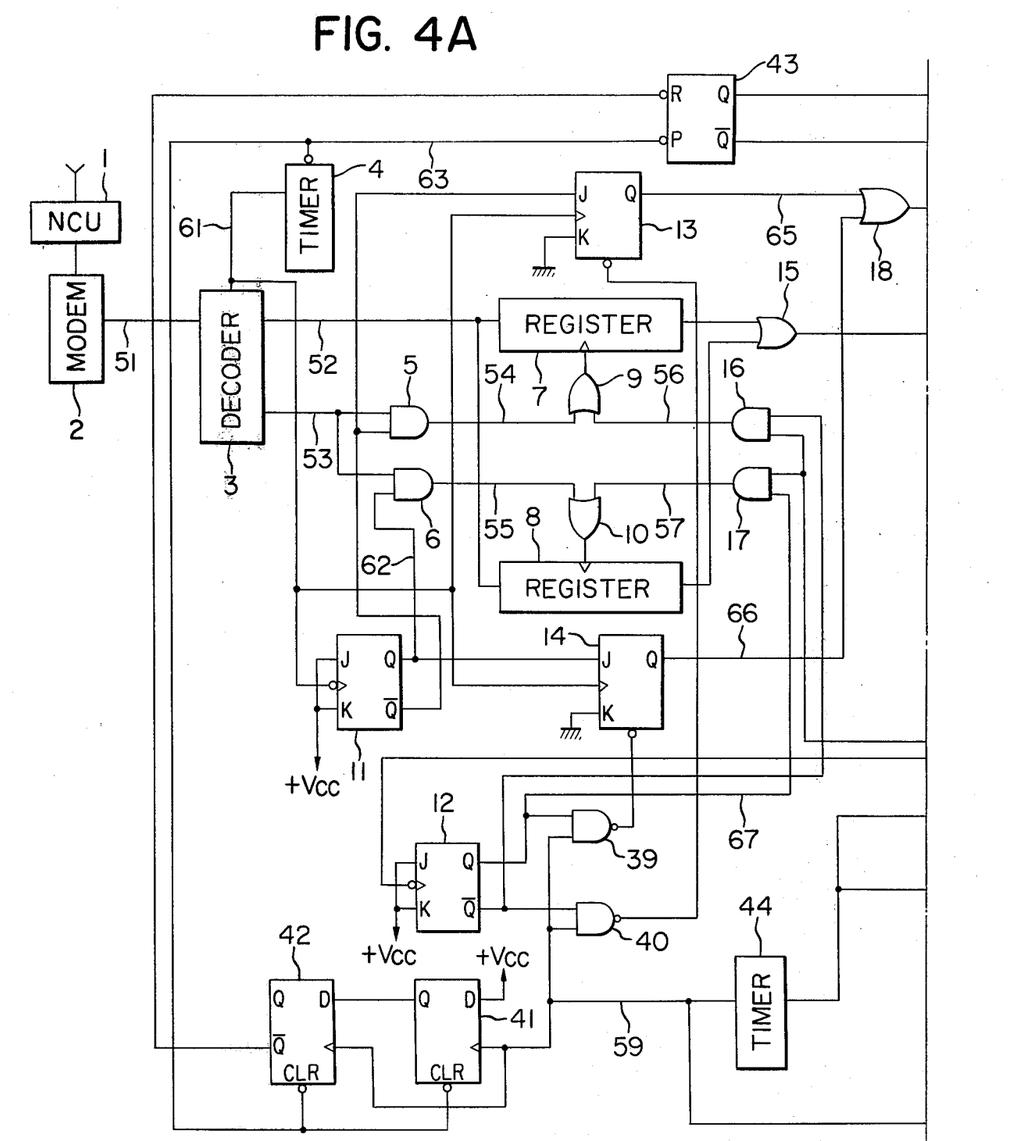
Figure 4B:
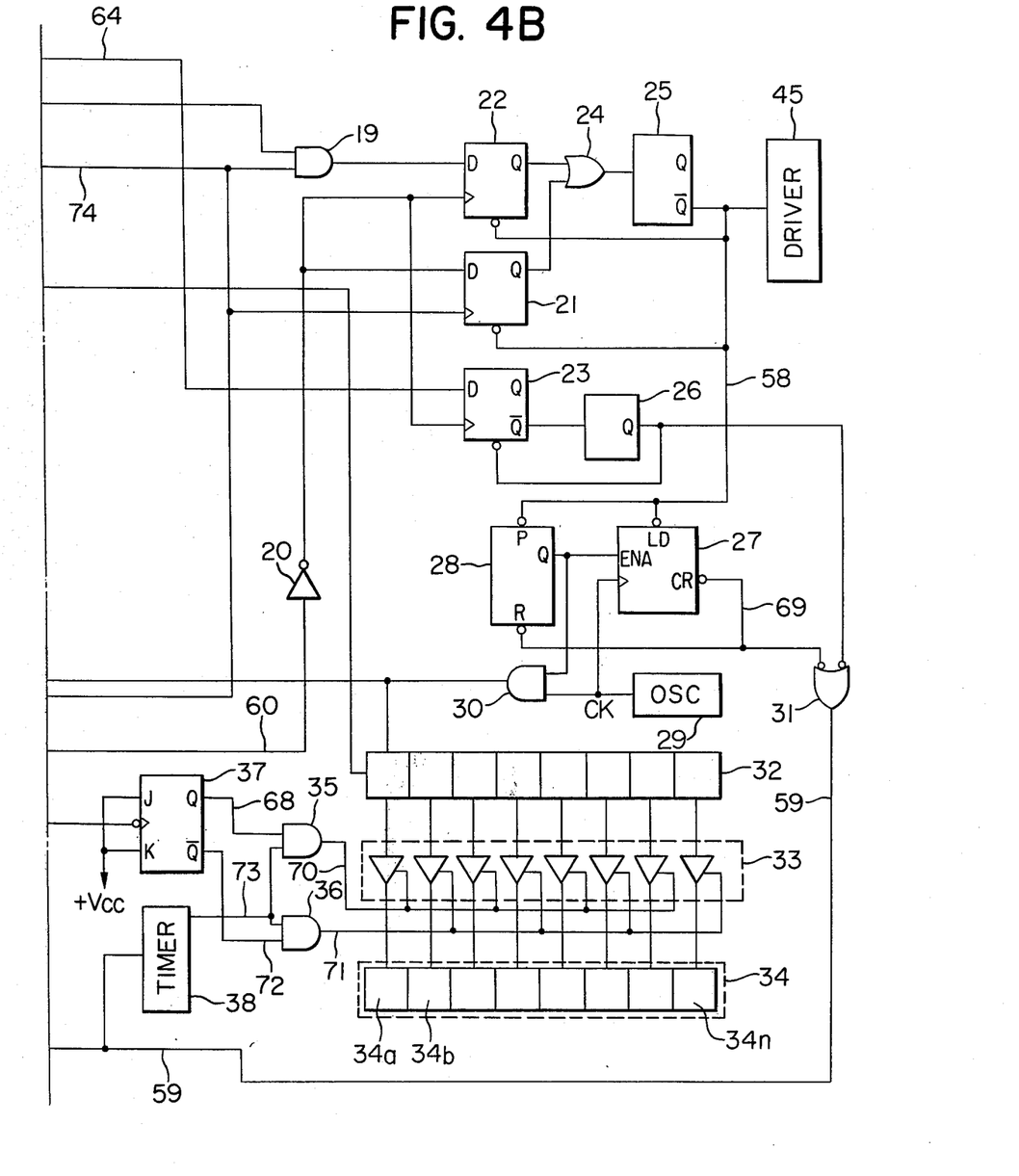

The time required for transferring the image signal for one line which is stored in registers 7 and 8 (to be described later) to a printer buffer 32 is made $T_T$. In this case, the following relationship will be established: $T_{MIN} > T_P + T_T$.

FIG. 4 shows an electrical circuit diagram of a signal receiver, designation of each component part corresponding to each reference numeral being as follows.

Figure 5:
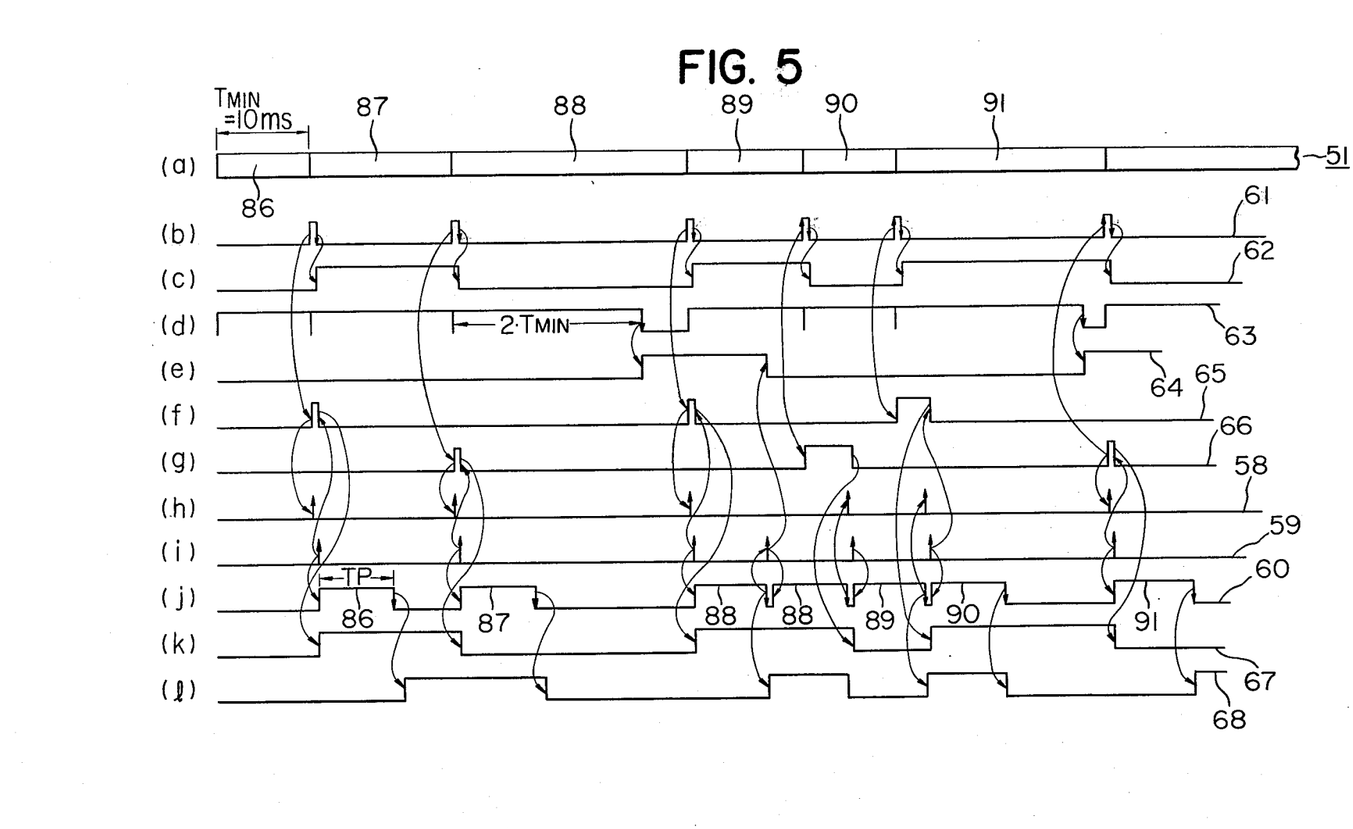
FIGS. 5(a) through 5(l) respectively show timing charts for each signal.

FIG. 5 shows timing charts at the time of the recording operations.

TABLE 2

| Ref. No. | Designation | Ref. No. | Designation | Ref. No. | Designation |
|---|---|---|---|---|---|
| 1 | NCU (Network Control Unit) | 25 | Print Mono/Multi | 51 | Binary Facsimile Signal |
| 2 | MODEM (Modulator/Demodulator) | 26 | Mono/Multi | 52 | Image Signal |
| 3 | Decoder | 27 | Data Counter | 53 | Image Signal Clock |
| 4 | Decoder Timer | 28 | RS F/F (Register Selector Flip-Flop) | 54 | Register(a) Write-In Clock |
| 5 | AND Gate | 29 | OSC (Oscillator) | 55 | Register(b) Write-In Clock |
| 6 | AND Gate | 30 | AND Gate | 56 | Register(a) Read-Out Clock |
| 7 | Register(a) | 31 | OR Gate | 57 | Register(b) Read-Out Clock |
| 8 | Register(b) | 32 | Print Buffer | 58 | Print Signal |
| 9 | OR Gate | 33 | Print Driver | 59 | Print Start Signal |
| 10 | OR Gate | 34 | Thermal Head (Recording Member) | 60 | Print Busy Signal |
| 11 | RIS F/F (Register Input Selector Flip-Flop) | 35 | AND Gate | 61 | Line Synchronous Signal |
| 12 | ROS F/F (Register Output (Selector Flip-Flop) | 36 | AND Gate | 62 | RIS Signal (Register Input Selector) |
| 13 | Register(a) Full F/F | 37 | PDS F/F (Print Driver Selector Flip-Flop) | 63 | Decode Timer Signal |
| 14 | Register(b) Full F/F | 38 | Print Timer | 64 | OTF Signal (Overtime Flag) |
| 15 | OR Gate | 39 | NAND Gate | 65 | Register(a) Full Signal |
| 16 | AND Gate | 40 | NAND Gate | 66 | Register(b) Full Signal |
| 17 | AND Gate | 41 | F/F (Flip-Flop) | 67 | ROS Signal (Register Output Selector) |
| 18 | OR Gate | 42 | F/F (Flip-Flop) | 68 | PDS Signal (Print Driver Selector) |
| 19 | AND Gate | 43 | OTF F/F (Overtime Flag Flip-Flop) | 69 | DCC Signal (Data Counter Carrier) |
| 20 | Inverter | 44 | Print Busy Timer | 70 | Group A (Enable Signal) |
| 21 | F/F (Flip-Flop) | 45 | Recording Paper Driving Section | 71 | Group B (Enable Signal) |
| 22 | F/F (Flip-Flop) | | | 72 | PDS Signal (Print Driver Selector) |
| 23 | F/F (Flip-Flop) | | 46–50 (Not Allotted) | 73 | Driver On Signal |
| 24 | OR Gate | | | 74 | Register Full Signal |

Referring now to FIGS. 4 and 5, the recording operations of the signal receiver will be explained in detail. In FIG. 4, a facsimile signal arriving at the receiver through a signal line passes through a network control unit (NCU) 1, and is converted into a binary facsimile signal 51 by a modulator/demodulator (MODEM) 2. The binary facsimile signal 51 results from a band compression treatment (e.g., Wyle codification, etc.) of the image signal at the signal transmission side.

A decoder 3 introduces this binary facsimile signal 51 (FIG. 5(a)) as an input thereto, and forwards an output therefrom (image signal 52) to the register(a) 7 and the register(b) 8, respectively, another output therefrom (image signal clock 53) to one of input sections of each of AND gates 5 and 6, and further output therefrom (line synchronous signal 61 (FIG. 5(b)) for each line) to respective decoder timer 4, RIS F/F 11, register(a) full F/F 13 and register(b) full F/F 14. Outputs Q, Q̄ from RIS F/F 11 are introduced as inputs to the other of the input sections of each of AND gates 5 and 6. Since the outputs Q and Q̄ emit mutually opposite signal outputs, either of the AND gates 5 and 6 is opened depending on the condition of RIS F/F 11 with the result that the image signal clock 53 passes through OR gate 9 (or 10) as a register write-in clock 54 (or 55), and is alternately distributed in the register(a) 7 or the register(b) 8. Consequently, the image signal 52 is alternately introduced as an input into the register(a) 7 and the register(b) 8 for each line. For instance, when the image signal for one line has been completely stored in the register(a) 7, and the subsequent line synchronous signal 61 (FIG. 5(b)) is generated, the register(a) full F/F 13 is set (or turned on) by the rising of the line synchronous signal pulse 61 (FIG. 5(f)), and RIS F/F 11 is reversed by the trailing of the line synchronous signal pulse 61 (FIG. 5(e)). Accordingly, the conditions of AND gates 5, 6 and OR gates 9, 10 are reversed, whereby the image signal 52 of the subsequent line is stored in the register(b) 8. On the other hand, a clock pulse which takes the above-mentioned image signal out of the above-mentioned registers and writes this image signal into a print buffer 32 is generated from an oscillator 29 (OSC), passes through the AND gate 30, and is added to this print buffer 32. At the same time, this clock pulse is added to one of the input sections of each of AND gates 16 and 17. Since the output from AND gates 16 and 17 cause the OR gates 9 and 10 to produce output signals, the image signals stored in the register(a) 7 and the register(b) 8 are shifted to the print buffer 32 through the OR gate 15. The selection as to from which register the image signal is to be taken out is determined by adding the outputs Q̄, Q of ROS F/F 12 to the other of the input sections of the AND gates 16 and 17 and opening thereby the OR gates 9 and 10. In this manner, when the data for one line is stored in the print buffer 32, a carry output 69 is generated from a data counter 27 to close AND gate 30 with an output signal Q of RS F/F 28, and, at the same time, a print start signal 59 (FIG. 5(i)) is generated as an output from the OR gate 31. This print start signal 59 is introduced as an input into timers 38 and 44. The output from this timer 38 is introduced as an input into one of the input sections of each of AND gates 35 and 36, while the output from the timer 44 is introduced as an input into the other of the input sections of each of the AND gates 35 and 36 through PDS F/F 37. The outputs from the AND gates 35 and 36 control the conductive state of a print driver 33. Parallel outputs from the print buffer 32 are added to a plurality of print drivers 33, and further added to thermal heads 34 (recording member) consisting of a plurality of recording elements 34a, 34b, . . . , 34n. Therefore, the thermal head 34 performs recording of the informations on recording paper (not shown) in accordance with outputs from the AND gates 35 and 36.

Explaining in more detail, the print drivers 33 are divided into A group (for even number drivers) and B group (for odd number drivers), and the driver outputs from the above-mentioned each group are turned on and off by the enabling signals 70 and 71 which are the outputs from the respective AND gates 35, 36. On the other hand, a PDS signal 68 (FIG. 5(l)) and a driver-on signal 73 are introduced into the input of the AND gate 35, while a PDS signal 72 and the driver-on signal 73 are introduced into the input of the AND gate 36, so that which one of the A and B groups of the print drivers 33 is to be selected for recording is determined by the condition of the PDS F/F 37. Further, the above-mentioned PDS F/F 37 is so constructed that its condition may be reversed at every time the print busy signal 60 (FIG. 5(j)) trails, i.e., at every completion of one recording operation. The print busy signal 60 which is an output from the print busy timer 44 determines the whereby OTF F/F 43 is turned off (or reset) with the output $\bar{Q}$ of the above-mentioned F/F 42.

In the following, the conditions for the print signal 58 and the print start signal 59 to be generated will be explained. These signals are generated by combination of three signals, i.e., the register full signal 74 which is an output from an OR gate 18, the print busy signal 60 (FIG. 5(j)) which is an output from the print busy timer 44, and the OTF signal 64 (FIG. 5(e)) which is an output from the output terminal Q of OTF F/F 43. The relationship among these three signals is shown in Table 3 below. (In the Table, the mark X indicates that the signal may be either "on" or "off" state.)

TABLE 3

| | SIGNAL | | | NO. OF RELEVANT F/F |
|---|---|---|---|---|
| | REGISTER FULL | PRINT BUSY | OTF | |
| CONDITION FOR PRINT SIGNAL 58 TO GENERATE | OFF ⟋ ON | OFF | X | 21 |
| | ON | ON ⟍ OFF | OFF | 22 |
| CONDITION FOR PRINT SIGNAL 59 TO GENERATE | X | ON ⟍ OFF | ON | 23 |
| | AFTER GENERATION OF PRINT SIGNAL AND COMPLETION OF SHIFTING OF DATA FROM REGISTER TO PRINT BUFFER | | | X | above-mentioned recording time $T_P$ (e.g. 8 m sec.). The electric conduction time (e.g. 1 m sec.) to the above-mentioned thermal head is determined by the driver-on signal 73 which is the output from the print timer 38. On the other hand, a print signal 58 (FIG. 5(h)) which is an output from a print mono/multi 25 is introduced into F/F 21, 22; RS F/F 28; data counter 27; and drive section 45. By this signal input, the RS F/F 28 produces an output signal from its output terminal Q to open the AND gate 30, while, in the drive section 45, the recording paper (not shown) is shifted for one line (this shifting direction is called an auxiliary scanning direction).

Further, in this embodiment, it is necessary to count the transmission time for every line of the facsimile signal to be received. The decoder timer 4 (re-triggerable mono/multi) is turned on by the line synchronous signal 61 emitted for every line, while the output 63 of the timer is connected to CLR (clear) terminal of F/F 41, 42. Furthermore, since the output of the timer is adjusted to be in $2 \cdot T_{MIN}$ as shown in FIG. 5(d), the output signal 63 (FIG. 5(d)) of the decoder timer is turned off when the transmission time of one line exceeds $2 \cdot T_{MIN}$ thereby setting OTF F/F 43. On account of this, OTF signal 64 (FIG. 5(e)) is produced as an output from the output terminal Q of OTF F/F 43, which is, in turn, introduced into F/F 23 as an input thereto, whereupon F/F 23 is turned on to actuate the above-mentioned timers 38, 44; flip-flop 37; and AND gates 35, 36 through the mono/multi 26 and OR gate 31 whereby the recording operations can be effected (with high resolution) by alternately changing over the group of the recording elements belonging to the A group (hereinafter referred to A group heads) and the group of recording elements belonging to the B group (hereinafter referred to B group heads). Moreover, after OTF F/F 43 is once turned on, the above-mentioned F/F 41 and 42 are actuated by a second print start signal 59, The register(a) full F/F 13 and the register(b) full F/F 14 are connected to the output terminals $\bar{Q}$, Q of RIS F/F 11, and, at the same time, introduce the line synchronous signal 61 from the decoder 3 into the respective input terminals thereof.

On the other hand, NAND gates 40, 39 take the outputs $\bar{Q}$, Q from ROS F/F 12 into one of the respective input sections thereof, and the print start signal 59 into the other of the input sections. The logical outputs from the NAND gates 40, 39 are introduced into the above-mentioned register(a) full F/F 13 and the register(b) full F/F 14, respectively. When the register(a) full signal 65 or the register(b) full signal 66 (FIG. 5(f) or 5(g)) is produced as the output from the respective F/F 13 and 14 and introduced into OR gate 18, the register full signal 74 output is produced from the OR gate 18, which is then introduced into ROS F/F 12 and AND gate 19 as the input thereto.

In accordance with this signal input, the contents of the register(a) 7 and the register(b) 8 are transferred to the print buffer 32 through the OR gate 15, as already mentioned in the foregoing. In order to re-write the informations in the print buffer 32 at this time, the print busy signal 60 which is an output from the print busy timer 44 should be turned off in advance of the above-mentioned transfer. The output Q of F/F 21 is turned on, when the register full signal 74 changes from its "off" state to "on" state in the state of the print busy signal 60 being "off" (the output of the inverter 20 being "on"). On the other hand, the output Q of F/F 22 is turned on, when the print busy signal 60 changes from its "on" state to its "off" state in the state of the register full signal 74 being "on", and the output $\bar{Q}$ of OTF F/F 43 being "off". Then, both outputs from F/F 21, 22 are introduced into OR gate 24, and the output from this OR gate 24 is introduced into print mono/multi 25 as an input thereto.

In this case, when the output Q of OTF F/F 43 is "on", F/F 22 is not turned on, even if the print busy signal 60 is changed from its "on" state to its "off" state. Accordingly, no image signal is transferred to the print buffer 32. Instead of this, OTF signal 64 turns F/F 23 on with the output Q of OTF F/F 43, while the output $\bar{Q}$ thereof generates the print start signal 59 through the mono/multi 26 and the OR gate 31, and the remaining half informations are printed by the thermal head 34 by the operations as mentioned above. This operation is for determining whether the abovementioned double writings is to be done, or not.

FIGS. 5(a) to 5(l) are the timing charts of various signals driven in the above-described receiver construction.

FIG. 5(a) indicates that the facsimile signal 51 is sent from the signal transmission side, wherein reference numerals 86 to 91 represent the line informations for six lines (the informations for definite numbers of scanning lines). For instance, the line 86 and the line 90 have their transmission time $T_{MIN}$, i.e., the time required for transmitting the informations for definite numbers of the scanning lines is short. Also, the line 88 and the line 91 have their transmission time $2 \cdot T_{MIN}$ and above, i.e., the time required for transmitting the informations for definite numbers of the scanning lines is long. The image recording of the lines having the long transmission time like the lines 88 and 91 is effected by the thermal heads of both A and B groups. The image recording of the lines having the short transmission time like the lines 86, 87, 89, and 90 is effected by the thermal heads of either A group heads or B group heads alone.

FIG. 5(b) indicates the line synchronous signal 61 which generates a pulse at the changing point of the above-mentioned lines.

FIG. 5(c) indicates RIS signal 62, the level of which is changed over at the trailing of the pulse in FIG. 5(b), wherein, when the level of the signal in FIG. 5(b) is low (lower level), the image signal is written in the register(a) 7, while, when the level of the signal is high (upper level), the image signal is written in the register(b) 8. (Hereinafter, the upper level is termed "high level", and the lower level is termed "low level").

FIG. 5(d) denotes the decode timer output 63, and FIG. 5(e) denotes the OTF signal 64. The OTF signal 64 assumes the high level at the trailing of the signal waveform in FIG. 5(d), and assumes the low level at the print start signal 59. (When the facsimile signals of lines 88 and 91 are being received, it becomes "on".)

FIG. 5(f) indicates the register full signal 65 and FIG. 5(g) the register full signal 66. These signals are set when the image signal 52 has completed its transfer, and are reset when the transfer from each register to the print buffers 32 has been completed.

FIG. 5(h) indicates the print signal 58 which shows driving of the pulse motor and commencement of the print operation.

FIG. 5(i) indicates the print start signal 59 and shows commencement of the actual recording.

FIG. 5(j) denotes the print busy signal 60, in which the reference numerals 86 to 91 represent the abovementioned lines during the recording.

FIG. 5(k) indicates the ROS signal 67 which takes out the image signal from the register(a) 7 at the time of the low level, and from the register(b) 8 at the time of the high level.

FIG. 5(l) indicates the PDS signal 68 which shows that the recording operation is done by the A group heads (or B group heads) at the time of the low level, and by the B (or A) group heads at the time of the high level. (In this case, the thermal head group to perform the printing is reversed, irrespective of whether the abovementioned double writing-in operation is effected, or not.)

The afore-described construction of the recording method and apparatus according to the present invention makes it possible to effect faster recording operation by the use of the recording members having medium recording speed (for example, thermal recording head). In other words, the medium speed recording members in use at present may also be employed as the recording members for the high speed facsimile, whereby the undesirable ghost phenomenon in the recorded image can be reduced, and the size-reduction of the apparatus can be realized.

In the foregoing, the hard-ware construction of the recording apparatus has been described, although the recording method of the present invention can, of course, be realized by the use of micro-processor. Moreover, in the present embodiment, the thermal heads are used in two divided groups. It goes without saying, however, that much faster printing speed can be attained by further dividing the thermal heads into many groups.

In the foregoing, explanations have been made such that, of the abovementioned groups of thermal heads, the information outputs are produced almost simultaneously with respect to the recording elements belonging to the common group. However, it is not always necessary to carry out the information output almost simultaneously, but such information output can be produced time-sequentially with respect to the recording elements in one group, followed by the same time-sequential information output with respect to the recording elements of other group.

Figure 6:
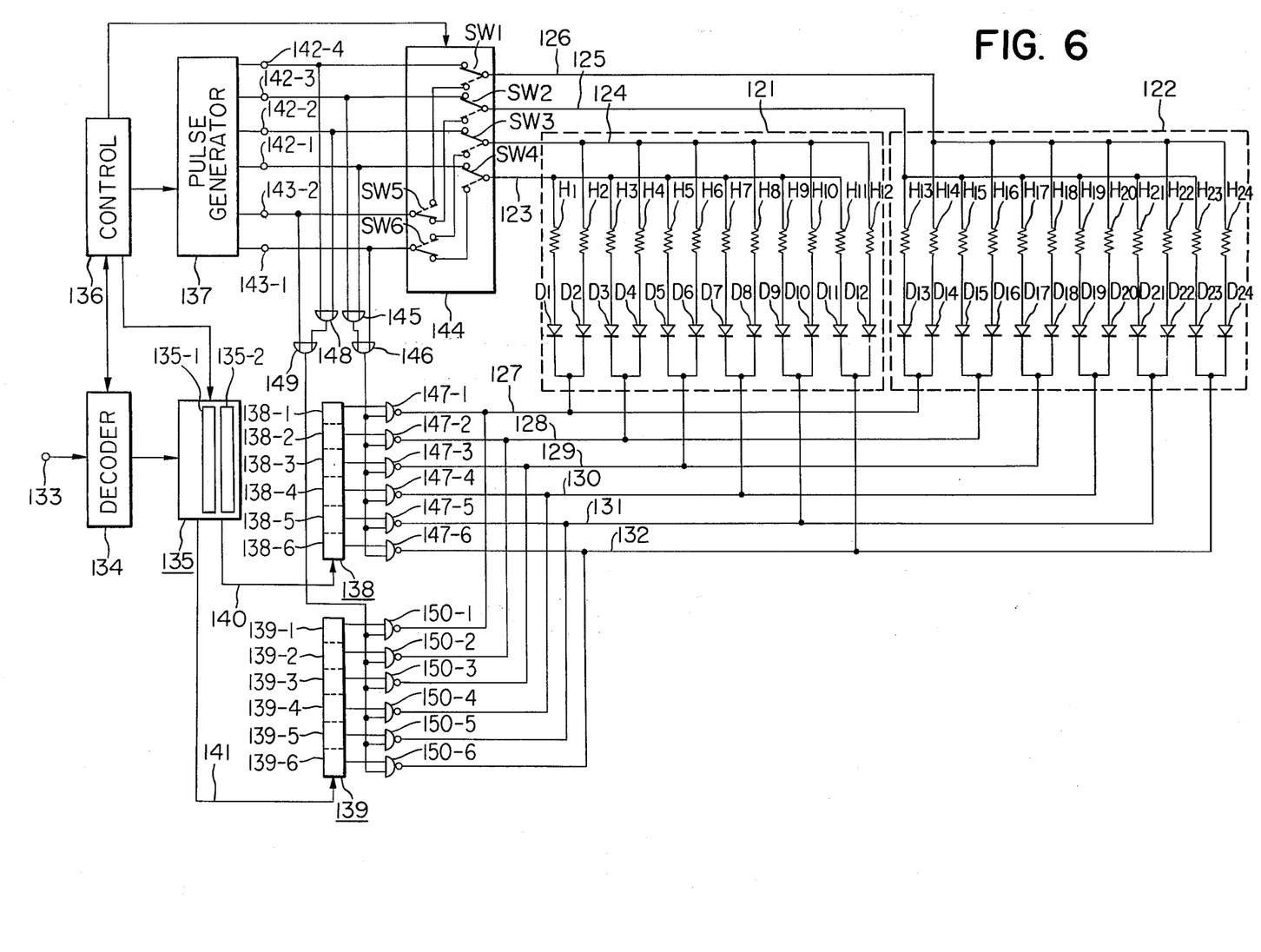
FIG. 6 is a circuit diagram showing another embodiment of the recording apparatus according to the present invention.
Figure 7:
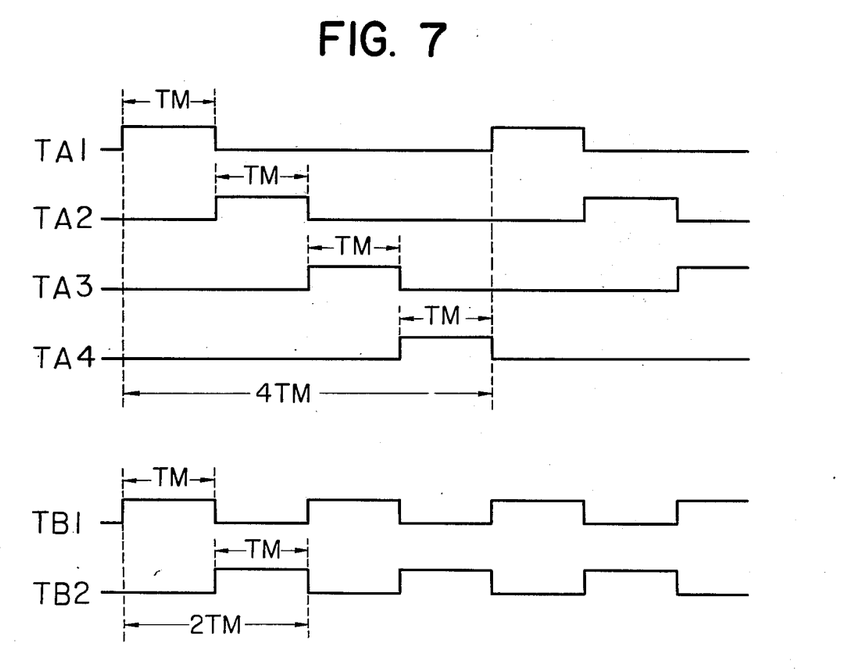
FIG. 7 represents signal waveforms of various parts in the recording apparatus in FIG. 6.

FIGS. 6 and 7 explain this point. In FIG. 6, reference symbols H1 to H24 and D1 to D24 respectively designate heat-generating elements and diodes. In the embodiment shown in FIG. 6, the heat generating elements H and the diodes D connected to the second electrode of the heat generating elements are divided into two major groups of 121 and 122. The first electrodes of the heat generating elements of odd number belonging to the major group 121 are connected in common to form an odd number group which is then connected to a signal line 123 (group selection line). In the meantime, the first electrode of the heat generating elements of even number are connected in common to form an even number group which is then connected to a signal line 124 (group selection line).

On the other hand, the cathode electrode of the diodes D in the group 121 are connected in such a manner that the adjacent odd and even number electrodes are joined together to form a block, and then each block is connected to each of signal lines 127 to 132, respectively. In the same manner, the adjacent odd and even number electrodes in the major group 122 are connected together to form a block, after which each block is connected to each of the signal lines 127 to 132 (recording signal application lines).

A run-length codified facsimile signal is applied to an input terminal 133. This facsimile signal is stored in a memory circuit 135 after it is decoded by a decoder 134 to be converted into the form of a recording signal.

The memrory circuit 135 separates the decoded recording signal into those belonging to the odd number and the even number, and sequentially stores the odd number recording signal in an odd number memory device 135-1 and the even number recording signal in an even number memory device 135-2.

Thus, in order to separate the recording signals into the odd and even numbers and to store them in the respective odd and even number memory devices 135-1 and 135-2, it is sufficient to construct the circuit in such a manner that the flip flop to be set in the initial state by a synchronous signal forwarded in advance of transmission of the facsimile signal for one line may be reversed at every arrival of the recording signal, and then selection of the odd number memory device 135-2, in which the recording signal is to be stored, may be done by an output from the flip-flop. Accordingly, the recording signal for at least one line is stored in the memory circuit 135 in a state of it being separated for the odd number memory device 135-1 and the even number memory device 135-2.

A control device 136 is to judge whether the facsimile signal applied to the terminal 133 is in total black for one line, or not, leads out a total black signal or non-total black signal, and controls a group selector 144, the memory circuit 135, and a pulse generator 137 by means of such total black signal or non-total black signal.

In order to effect such judgement, it is sufficient to discriminate whether the facsimile signal applied to the terminal 133 is the facsimile signal (codified signal) showing the total black for one line, or not. Designated by reference numerals 138, 139 are registers to store therein the recording signal to be applied to the abovementioned heat generating elements H. Each of the registers 138, 139 consists of six memory elements connected in series to store therein the recording signal to be applied to the abovementioned signal lines 127 to 132, and the respective recording signals are applied thereto from the memory circuit 135 through the respective signal lines 140 and 141.

The abovementioned pulse generator 137 generates a group selection pulse to select the group concerned, i.e., when the abovementioned control device 136 leads out the nontotal black signal, it leads out pulses as shown by TA1 to TA4 in FIG. 7 from the terminals 142-1 to 142-4, and when the control device 136 leads out the total black signal, it leads out pulses as shown by TB1 and TB2 in FIG. 7 to the terminal 143-1 and 143-2, respectively.

The group selection pulses led out of the abovementioned terminals 142 and 143 are applied to the group selector 144, from which the group selection pulses to be applied to the signal lines 123 to 126 are selected by controlling the switches SW1 to SW4, SW5, and SW6 by the discrimination output from the control device 136. In more detail, when the control device 136 leads out the non-total black signal, the switches SW1 to SW4 are controlled as indicated by a solid line to apply the pulse signals at the terminals 143-1 to 143-4, as they are, to the signal lines 123 to 126, and, when the control device 136 leads out the total black signal, the switches SW1 to SW4 are controlled as shown by a dot line, and the switches SW5 and SW6 as shown by the dot line or solid line to apply the pulse signals at the terminals 143-1 and 143-2 selectively to the signal lines 123 to 126. Further, the group selection pulses led out of the terminals 142-1 and 142-3 are applied to an OR gate 146 through an OR gate 145. To this OR gate 146, there is further applied a group selection pulse led out of the terminal 143-1, and an output from this OR gate 146 is applied to NAND gates 147-1 to 147-6. To this NAND gates 147, there are applied outputs of the stored contents in the memory elements 138-1 to 138-6 constituting the registers 138, whereby the NAND gates 147-1 to 147-6 are connected to the abovementioned signal lines 127 to 132, respectively.

The group selection pulses led out of the terminals 142-2 and 142-4 are applied to an OR gate 149 through an OR gate 148. To this OR gate 149, there are further applied a group selection pulse led out of the terminal 143-2, and an output of the OR gate 149 is applied to NAND gate 150-1 to 150-6. The NAND gates 150 produce as output therefrom the stored contents in the memory elements 139-1 to 139-6 constituting the registers 139, whereby the NAND gates 150-1 to 150-6 are connected to the signals lines 127 to 132, respectively.

In the facsimile receiving apparatus of the abovedescribed construction, when the facsimile signal which is not the total black signal for one line is applied to the terminal 133, the facsimile signal is decoded by the decoder 134 in the form of the recording signal, and stored in the odd number memory device 135-1, if it is the odd number recording signal (image signal), and in the even number memory device 135-2, if it is the even number recording signal.

Further, the facsimile signal is discriminated by the control device 136 to lead out the non-total black signal, and such non-total black signal is applied to the memory circuit 135, whereby the contents of the odd number memory device 135-1 are stored in the registers 138 through the signal line 140, and the contents of the even number memory device 135-2 are stored in the registers 139 through the signal line 141.

Moreover, by application of the non-total black signal to the pulse generator 137, the group selection pulse is applied to the group selector 144 from the terminal 142 of the pulse generator 137, the switches SW1 to SW4 constituting the group selector 144 are controlled as indicated by a solid line by the non-total black signal, and the outputs from the terminal 142-1 to 142-2 are applied to the signal lines 123 to 126 as they are. That is, the group selection pulse TA1 is led out to the signal line 123 over a period of TH, the signal line 123 is driven for a period of TM, and one of the input terminals of the AND gate 147 is maintained at a high level. As the result, only the NAND gates 147 corresponding to the memory elements which store therein the high level signals (the signal to record black) out of the memory elements 138-1 to 138-6 assume the low level, and the heat generating element H connected to the signal lines 127 to 132 assuming such low level generates heat.

In this way, when a time TM lapses, the odd number heat generating elements belonging to the major group 121 terminate driving, and the pulse TA2 is subsequently led out of the terminal 142-2. The lead-out of the pulse TA2 drives the signal line 124, and maintains one of the input terminals of the NAND gate 150 at the high level, whereby only the NAND gates 150 corresponding to the memory elements which store therein the high level signal in the memory elements 139-1 to 139-6 assume the low level, and the heat generating element H connected to the signal lines 127 to 132 at the low level generates heat. Since the contents of the registers 138 which have terminated the recording operations while the contents of the registers 139 are being recorded as mentioned above are renewed in preparation for the subsequent recording, the odd number recording signals of the major group 122 are stored in the registers 138 at the time instant when the recording of the contents of the registers 139 terminate. In the similar manner to the abovementioned major group 121, the odd number and even number heat generating elements in the major group 122 are driven. Thus, when the non-total black signal is applied, the entire recording operations are completed in a time 4TM same as in the conventional technique.

In contrast to this, when the facsimile signal applied from the terminal 133 is in the total black, such facsimile signal is decoded in the form of the recording signal, and stored in the odd number memory device 135-1 and the even number memory device 135-2 of the memory circuit 135, and, at the same time, the control device 136 leads out the total black signal. In this consequence, only the contents of the odd number memory device 135-1 or the even number memory device 135-2 are applied to the registers 138 or 139 from the memory circuit 135 which is controlled to this total black signal, the abovementioned pulse generator 137 leads out the pulses TB1 and TB2 from the terminal 143, and the pulses are selectively applied to the signal lines 123 to 126 as the group selection pulses. Explaining in more detail, when the total black signal is led out as such, the control is effected in such a manner that only one group belonging to the major groups is driven, and the other groups are not driven, but only one group belonging to the subsequent major groups is driven.

Accordingly, at the recording of a certain row, only the content of the odd number memory device 135-1 is produced as an output to the registers 138 and 139, and the group selection pulses TB1 and TB2 are applied to the signal lines 123 and 125 connected to the odd number heat-generating elements in the major groups 121 and 122. At the recording of the subsequent row which follows the abovementioned row, only the content of the even number memory device 135-2 is produced as an output to the registers 138 and 139, and the group selection pulses TB1 and TB2 are applied to the signanl lines 124 and 126 connected to the even number heat generating elements in the major groups 121 and 122. For example, when a certain row (n row) is in the total black, the switches SW1 to SW4 of the groups selector 144 are controlled as shown by the dot line, and the switches SW5 and SW6 as shown by the solid line so that the pulse of the terminal 143-1 may be applied to the signal line 123 and the pulse of the terminal 143-2 may be applied to the signal line 125 by storing the initial 6-bit signal of the odd number memory device 135-1 in the registers 138, and the subsequent 6-bit signal in the registers 139.

Accordingly, by application of the group selection pulse TB1, the heat generating element belonging to the group connected to the signal line 123 by the recording signal in the registers 138 is driven. In this manner, when the period TM of the pulse TB1 terminates, the group selection signal TB2 is applied to the signal line 125 by the group selector 144, and the content of the registers 139 led out to the signal lines 127 to 132, whereby the heat generating element belonging to the group connected to the signal line 125 is driven. In other words, instead of rendering the recording density for one line to be ½, the recording speed is increased twice as high as the normal speed.

Thus, when the recording of a certain row (n row) is completed, the subsequent facsimile signal is received and decoded by the decoder, after which the decoded signals are separated into the odd number signal and the even number signal to be stored in the odd number memory device 135-1 and the even number memory device 135-2. If the facsimile signal of this row (n+1 row) is also the total black signal over the entire row, the recording signal of the even number memory device 135-2 of the memory circuit 135 is sequentially stored in the registers 138 and 139, and the switches SW5 and SW6 of the group selector 144 is controlled as shown by the dot line so as to lead out the group selection pulses TB1 and TB2 to the signal lines 124 and 126.

In such construction, only the even number groups in the major groups are driven in the n+1st row. The reason for sequentially changing the groups to be driven when the total black conditions continue as the nth row, n+1st row, n+2nd row, ... is to record the portion to be rendered in the solid black in the checkered pattern. Thus, in order to change the groups to be driven for every row, the flip-flop is provided in the control device, and control is effected in such a manner that, when the flip-flop is leading out a set output, the group selection pulses TB1 and TB2 are applied to the odd number groups in the major groups and the output from the odd number memory device 135-1 is produced to the registers 138 and 139, and, when the flip-flop is leading out the reset output, the group selection pulses TB1 and TB2 are applied to the even number groups in the major groups, the output from the even number memory device 135-2 is applied to the registers 138 and 139, and the flip-flop may reverse its state from the total black signal.

In the above-described embodiment, the total black state is detected by the control device 136 to increase the recording speed by reducing the recording density from 8 lines/mm to 4 lines/mm. The present invention is not limited to the construction, wherein the recording density is automatically changed over by detecting the total black state as such, but it may also be constructed in such a way that the recording density may be changed over by the manual switch. Moreover, it is possible to change the recording density by detecting arrival of the black signal of a certain definite quantity and above, without detecting the total black state.

Further in the above-described embodiment, explanations have been given only to a case, wherein the major group is divided into two groups, i.e., odd number group and even number group. However, it is also possible to divide the major groups into three or more groups on the basis of the same concept.

As has so far been explained in the foregoing, the recording method and apparatus of the present invention has the same number of signal lines to selectively drive the memory elements as in the conventional recording apparatus, and is able to increase the recording speed by reducing the recording density, depending on necessity.

What is claimed is:

1. A recording process which comprises recording a part of image information with recording elements of one of plural groups of recording elements, when the image information to be recorded on a recording medium consists of black information exceeding a determined amount and is identified to require a transmission time shorter than a determined time, and recording all said information with all said recording elements by activating said groups in succession when said information is identified to require a transmission time longer than said determined time.

2. A recording process which comprises driving said recording medium for every single recording operation with the recording elements, when the image information to be recorded on a recording medium consists of black information exceeding a determined amount and is identified to require a transmission time shorter than a determined time, and, driving said recording medium for every plural recording operation with said recording elements when said information is identified to require a transmission time longer than a determined time.

3. A recording process which comprises, recording a first recording scan line having periodical black information along a principal scanning direction on said recording medium, when the information to be recorded on a recording medium consists of black information exceeding a determined amount, and further recording black information in a second recording scan line adjacent to said first recording scan line within areas facing the areas of said first recording scan line not containing said black information.

4. A recording apparatus, comprising: recording means provided with plural recording elements for information recording on a recording medium, wherein said recording elements are divided into plural groups for recording with each of said plural groups; and selecting means adapted for selecting, when the information to be recorded on said recording medium consists of black information exceeding a determined amount, one of said groups of said recording means to control the recording in such a manner as to record a part of black information on a first recording scan line and then selecting one of the remaining groups to control the recording in such a manner as to record the black information in a second recording scan line adjacent to said first recording scan line within areas facing the areas of said first recording scan line not containing said black information.

5. A recording apparatus comprising:
recording means provided with plural recording elements for information recording on a recording medium, wherein said recording elements are divided into plural groups for recording with each of said plural groups;
transmission time identifying means adapted for identifying whether the transmission time required by the information of a scan line is longer or shorter than a determined transmission time and releasing an identification signal accordingly; and
selecting means adapted to select the recording elements in said recording means in such a manner as to cause the recording elements of all said groups to record all the information of one scan line upon receipt of said identification signal from said identifying means indicating a longer transmission time than said determined transmission time, or to cause the recording elements of a part of said groups to record a part of said information of one scan line upon receipt of said identification signal from said identifying means indicating a shorter transmission time than said determined transmission time.

6. A recording apparatus according to claim 5, wherein said selecting means are adapted, in case of selective recording of a part of said information on a first recording scan line in response to an identification signal from said identifying means indicating a shorter transmission time than said determined transmission time, to select, for a second recording scan line adjacent to said first recording scan line, the recording elements of groups different from those selected for said first recording scan line.

7. A recording apparatus according to claim 5, wherein said selecting means are adapted to cause the recording elements in any group substantially simultaneously to record said information.

8. A recording apparatus according to claim 5, wherein siad selecting means are adapted to cause the recording elements in any group to record said information in successive order.

9. A recording apparatus according to any of claims 5, 6, 7 or 8, wherein said recording means comprise a thermal recording head adapted for recording said information by heat generation.

10. A recording apparatus, comprising:
recording means provided with plural recording elements for information recording on a recording medium, wherein said recording elements are divided into plural groups for recording with each of said plural groups;
transmission time identifying means adapted to identify whether the transmission time required by the information of a scan line is longer or shorter than a determined transmission time and to release an identification signal accordingly; and
drive means adapted, in response to an identification signal from said identifying means indicating a longer transmission time than said determined transmission time, for causing the recording elements of all said groups to record the information of a scan line with a high recording density and then driving said recording medium in a direction substantially orthogonal to said scan line, or, in response to an identification signal indicating a shorter transmission time than said determined transmission time, for causing the recording elements of a part of said groups to record the information of said scan line with a low recording density and then driving said recording medium in a direction substantially orthogonal to said scan line.

11. A recording apparatus according to claim 10, wherein said drive means are adapted to drive said recording medium at a lower speed in case of recording with said high density and at a higher speed in case of recording with said low density.

12. A recording apparatus according to claim 10, wherein said drive means are adapted to drive said recording medium for every plural recording operation with said recording means in case of recording with said high density, and driving said recording medium for every single recording operation with said recording means in case of recording with said low density.

13. A recording apparatus according to claim 10, further comprising selecting means adapted to select the recording elements in said recording means in such a manner as to cause the recording elements of all said groups to record all the information of one scan line upon receipt of said identification signal from said identifying means indicating a longer transmission time than said determined transmission time, and to cause the recording elements of a part of said groups to record a part of said information of one scan line upon receipt of said identification signal from said identifying means indicating a shorter transmission time than said determined transmission time.

14. A recording apparatus, comprising:
recording means provided with plural recording elements for information recording on a recording medium, wherein said recording elements are divided into plural groups for recording with each of said plural groups;

selecting means adapted to control the recording in such a manner that, when the information to be recorded on said recording medium consists of black information exceeding a determined amount and is identified to require a transmission time longer than a determined transmission time, the recording elements of all said groups record all said information of one scan line and that, when said information is identified to require a transmission time shorter than said determined transmission time, one of said groups in said recording means is selected thereby recording a part of black information on a first recording scan line and one of the remaining groups is selected thereby recording black information in a second recording scan line adjacent to said first recording scan line within areas facing those not containing black information in said first recording scan line; and drive means adapted to drive said recording medium in a direction substantially orthogonal to the scan line for every plural recording operation with said recording means in case said selecting means said groups for recording all the information of one scan line and driving said recording medium in a direction substantially orthogonal to the scan line for every single recording operation with said recording means in case said selecting means selects one of said groups for recording a part of the information of one scan line.

15. A recording apparatus according to claim 14, further comprising transmission time identifying means adapted to identify whether the transmission time required by the information of a scan line is longer or shorter than a determined transmission time and releasing an identification signal for controlling said selecting means and drive means accordingly.

16. A recording apparatus according to any of claims 14 or 15, wherein said recording means comprise a thermal recording head for information recording by heat generation.

17. A recording apparatus comprising:
receiving means for receiving image information;
memory means for storing image information supplied from said receiving means;
recording means comprising plural recording elements divided into plural groups for recording said image information supplied from said memory means on a recording medium;
transmission time identifying means receiving line synchronizing signals from said receiving means and adapted to identify a transmission time in excess of a determined transmission time;
drive means for driving said recording medium;
record control means for controlling the drive speed of said drive means and the recording density of said recording means in response to the output from said transmission time identifying means; and
selecting means for selectively activating said groups of said recording means in response to the control by said record control means.

18. A recording apparatus according to claim 17, wherein said selecting means are adapted, when the transmission time for said information is identified to be longer than said determined transmissiion time by said transmission time identifying means, to cause all the recording elements in said recording means to record all said information, and, when the transmission time for said information is identified to be shorter than said determined transmission time, to cause the recording elements of a part of groups in said recording means to record a part of said information.

19. A recording apparatus according to claim 17, wherein said drive means are adapted, when the transmission time for said information is identified to be longer than said determined transmission time by said transmission time identifying means, to drive said recording medium after plural recording operations with said recording means, and, when the transmission time for said information is identified to be shorter than said determined transmission time, to drive said recording medium after a single recording operation with said recording means.

20. A recording apparatus according to claim 17, wherein said record control means are adapted, when the transmission time for said information is identified to be longer than said determined transmission time by said transmission time identifying means, to activate said selecting means in a manner to cause all the recording elements in said recording means to record all said information and to cause said drive means to drive said recording medium after plural recording operations with said recording means, and, when the transmission time for said information is identified to be shorter than said determined transmission time by said transmission time identifying means, to activate said selecting means in a manner to cause the recording elements of a part of groups in said recording means to record a part of said information and to cause said drive means to drive said recording medium after a single recording operation with said recording means.

21. A recording apparatus according to any of claims 18, 19 or 20, wherein said recording means are adapted, when the transmission time for said information is identified to be shorter than said determined transmission time by said transmission time identifying means, to record black information in a second recording scan line adjacent to a first recording scan line within areas facing those of said first recording scan line not containing black information.

22. A recording apparatus, comprising:
receiving means for generating image signals, clock signals and line synchronizing signals in response to received image information;
first and second memory means for storing said image signals received from said receiving means;
entering means for entering said image signals alternately into said first and second memory means in response to said clock signals received from said receiving means;
extracting means for extracting said image signals alternately from said first and second memory means;
third memory means for storing said image signals extracted by said extracting means;
recording means comprising plural recording elements divided into plural groups for recording said image signals extracted from said third memory means onto a recording medium;
transmission time identifying means receiving said line synchronizing signals and adapted for identifying a transmission time in excess of a determined transmission time;
drive means for driving said recording medium; and selecting means for selectively activating said groups of said recording means.

23. A recording apparatus according to claim 22, further comprising record control means for controlling the drive speed of said drive means and the recording density of said recording means in response to the output from said transmission time identifying means.

24. A recording apparatus according to claim 23, wherein said record control means are adapted, when the transmission time for said information is identified to be longer than said determined transmission time by said transmission time identifying means, to activate said selecting means in such a manner as to cause all the recording elements in said recording means to record all said information and to cause said drive means to drive said recording elements in said recording means to record all said information and to cause said drive means to drive said recording medium after plural recording operations with said recording means, and, when the transmission time for said information is identified to be shorter than said determined transmission time by said transmission time identifying means, to activate said selecting means in a manner to cause the recording elements of a part of groups in said recording means to record a part of said information and to cause and drive means to drive said recording medium after a single recording operation with said recording means.

25. A recording apparatus according to any of claims 22, 23 or 24, wherein said recording means are adapted, when the transmission time for said information is identified to be shorter than said determined transmission time by said transmission time identifying means, to record black information in a second recording scan line adjacent to a first recording scan line within areas facing those of said first recording scan line not containing black information.

26. A recording apparatus according to claim 22, wherein said selecting means are adapted, when the transmission time for said information is identified to be longer than said determined transmission time by said transmission time identifying means, to cause all the recording elements in said recording means to record all said information, and, when the transmission time for said information is identified to be shorter than said determined transmission time, to cause the recording elements of a part of groups in said recording means to record a part of said information.

27. A recording apparatus according to claim 22, wherein said drive means are adapted, when the transmission time for said information is identified to be longer than said determined transmission time by said transmission time identifying means, to drive said recording medium after plural recording operations with said recording means, and, when the transmission time for said information is identified to be shorter than said determined transmission time, to drive said recording medium after a single recording operation with said recording means.

28. A recording apparatus, comprising:
recording means comprising plural recording elements for information recording on a recording medium, said recording elements being divided into plural groups and plural larger groups;
group selecting means for selecting said plural groups and plural larger groups of said recording means;
control means for controlling said group selecting means;
signal generating means for supplying signals to said selecting means, in response to a signal indicating a first recording state received from said control means, to cause the recording elements of all said groups to record all said information of a scan line, and, in response to a signal indicating a second recording state received from said control means, to select the recording elements of one of said groups to record a part of black information on a first recording scan line and then selecting one of the remaining groups to record black information on a second recording scan line adjacent to said first recording scan line in areas facing those of said first recording scan line not containing said black information.

29. A recording apparatus according to claim 28, wherein said control means are adapted to generate a signal indicating said first recording state when said information is composed of black information not in excess of a determined amount, or a signal indicating said second recording state when said information is composed of black information in excess of a determined amount.

30. A record apparatus according to either of claims 28 or 29, wherein said group selecting means are adapted, in response to a signal indicating a first recording state received from said control means, to select said larger groups in succession for every recording operation with the recording elements of plural groups, and, in response to a signal indicating a second recording state, to select said plural larger groups in succession for every recording operation with the recording elements of a group.

* * * * *

UNITED STATES PATENT AND TRADEMARK OFFICE
CERTIFICATE OF CORRECTION

PATENT NO. : 4,264,933

DATED : April 28, 1981

INVENTOR(S) : SADASUKE KURAHAYASHI, ET AL.

It is certified that error appears in the above—identified patent and that said Letters Patent is hereby corrected as shown below:

Column 4, line 15, "Rum" should be --Run--.

Column 5, line 30, "electronic" should be --electric--.

Column 13, line 13, after "device" insert --135-1 and the even number memory device--.

Column 14, line 40, "142-2" should be --142-4--.

Column 15, line 39, "signanl" should be --signal--; line 42, "(n row)" should be --($\underline{n}$ row)--; line 65, "(n row)" should be --($\underline{n}$ row)--.

IN THE CLAIMS

Column 18, line 8, "siad" should be --said--.

Column 21, line 8, "23" should be --22--.

Signed and Sealed this

Thirteenth Day of October 1981

[SEAL]

Attest:

GERALD J. MOSSINGHOFF

Attesting Officer       Commissioner of Patents and Trademarks